Nov. 5, 1935. J. C. BELL 2,020,231
LOADING DEVICE
Filed May 5, 1933 16 Sheets-Sheet 5
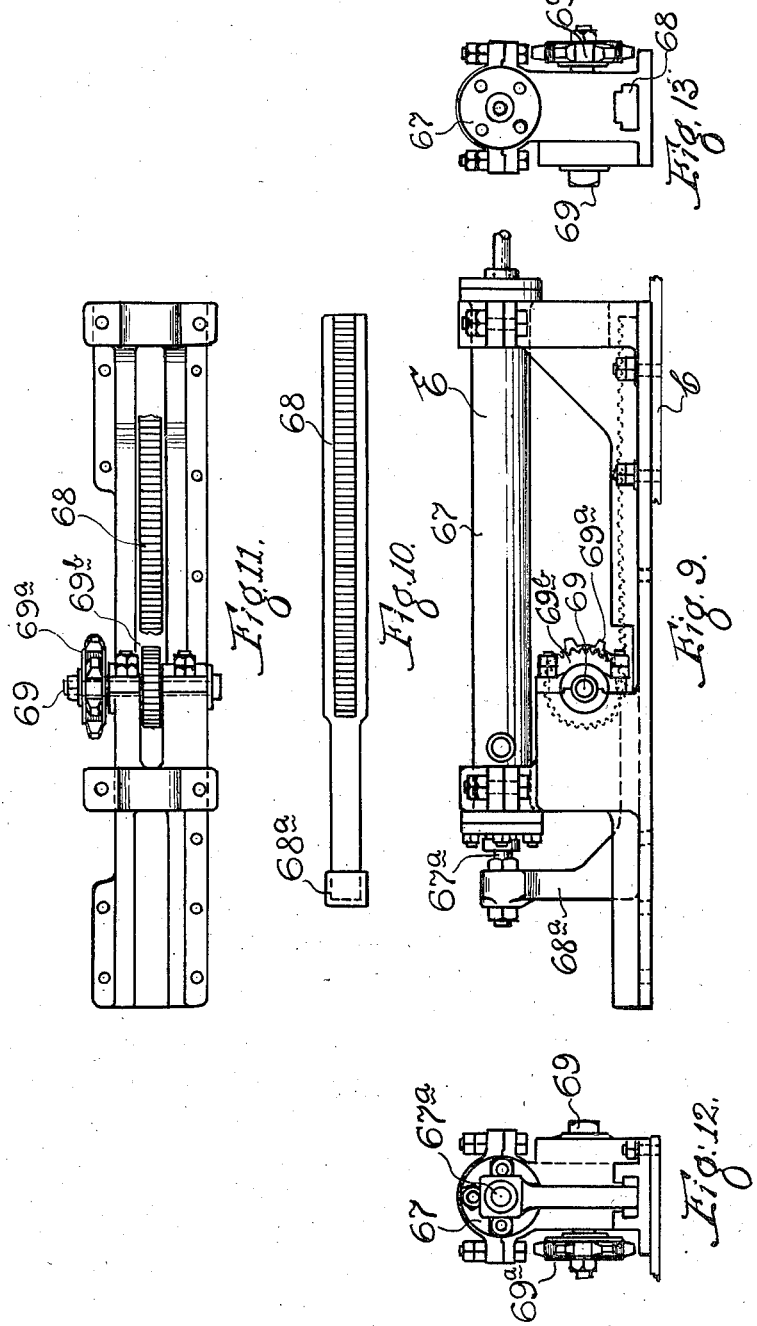
Inventor:
James C. Bell,
By Dyrenforth, Lee, Chritton & Wiles
Attys.

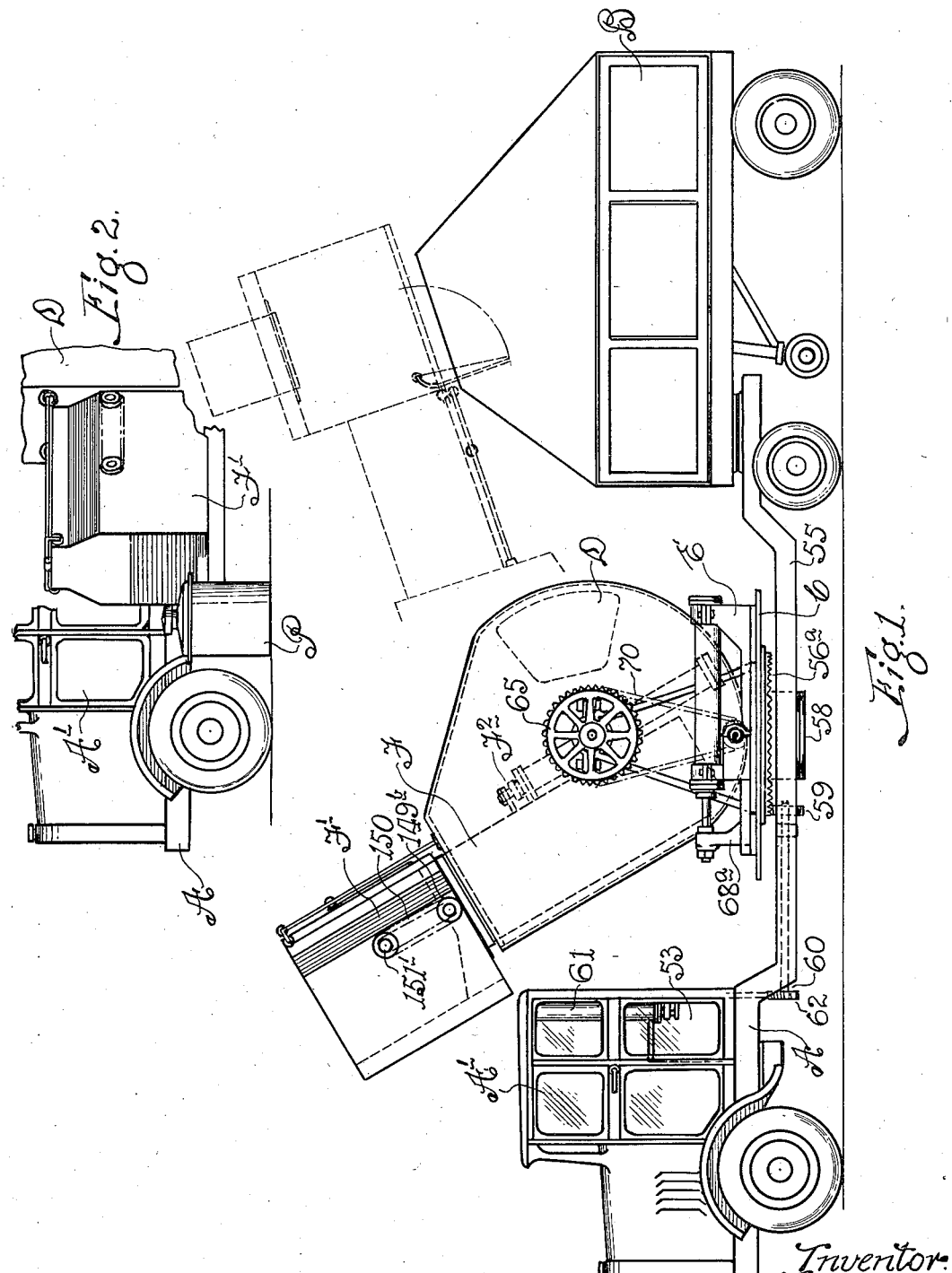

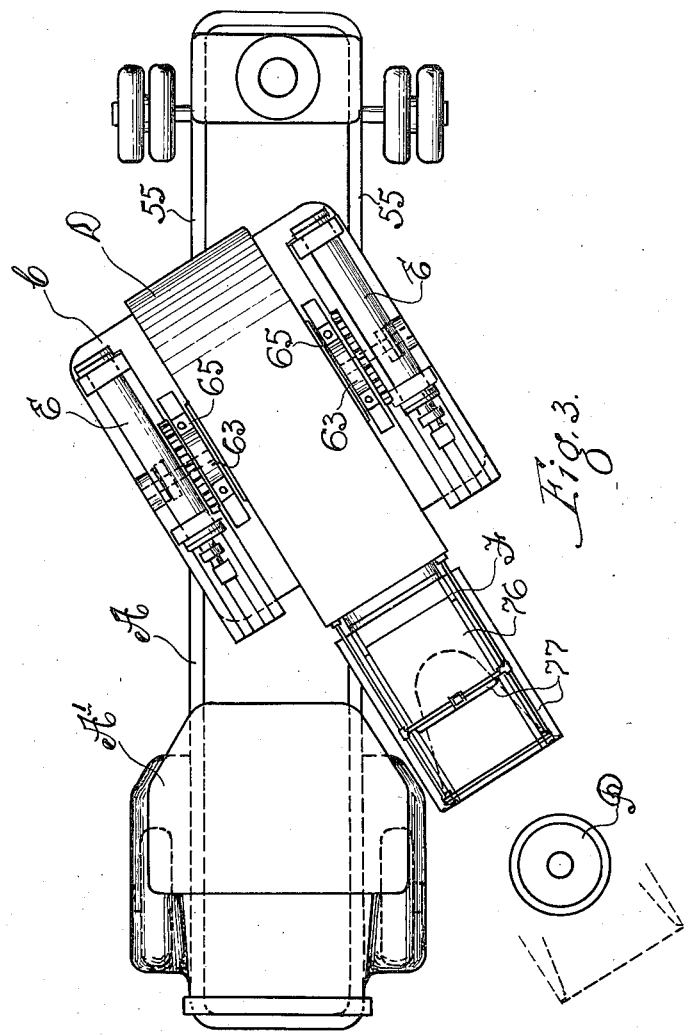

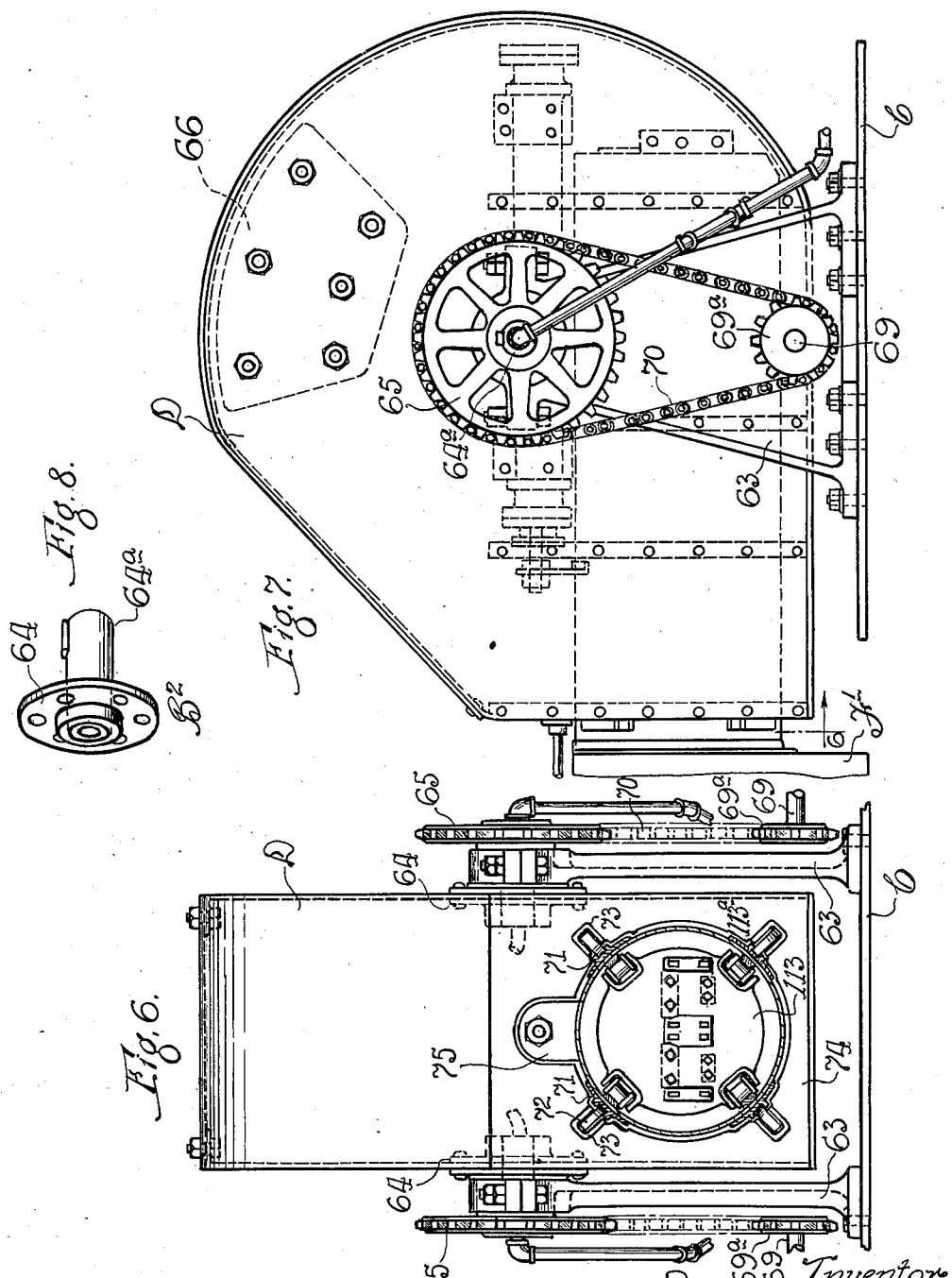

Nov. 5, 1935.  J. C. BELL  2,020,231
LOADING DEVICE
Filed May 5, 1933   16 Sheets-Sheet 6
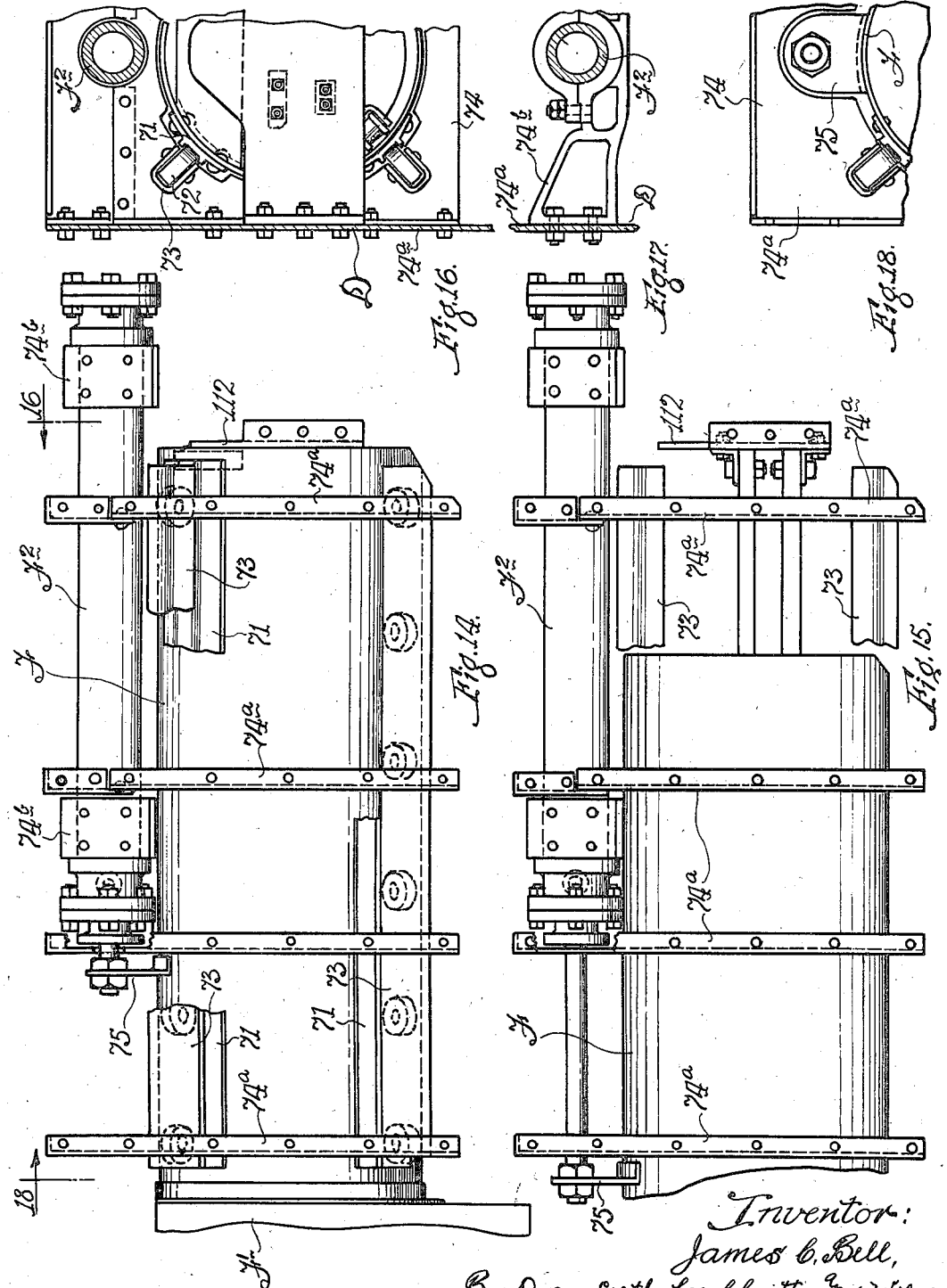

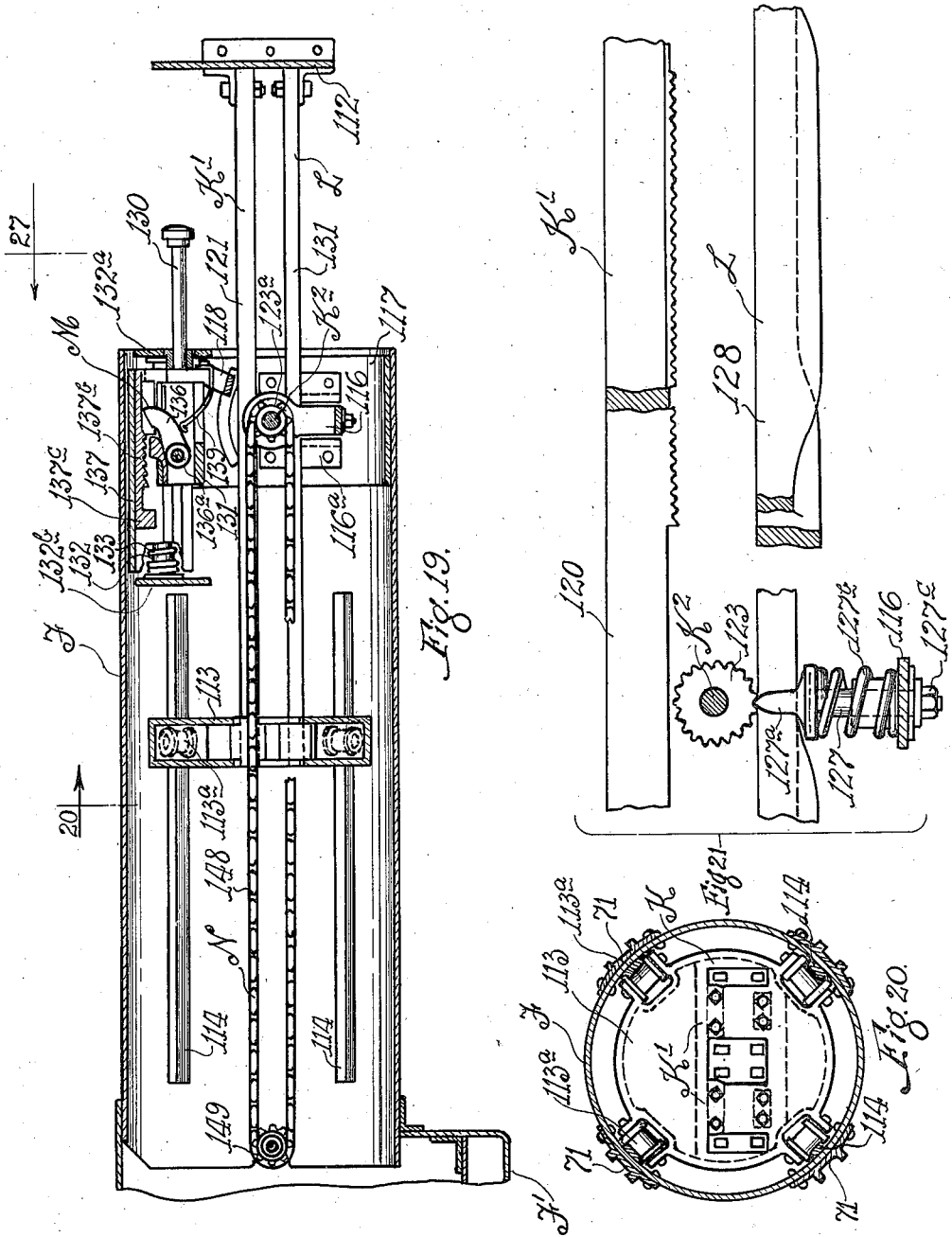

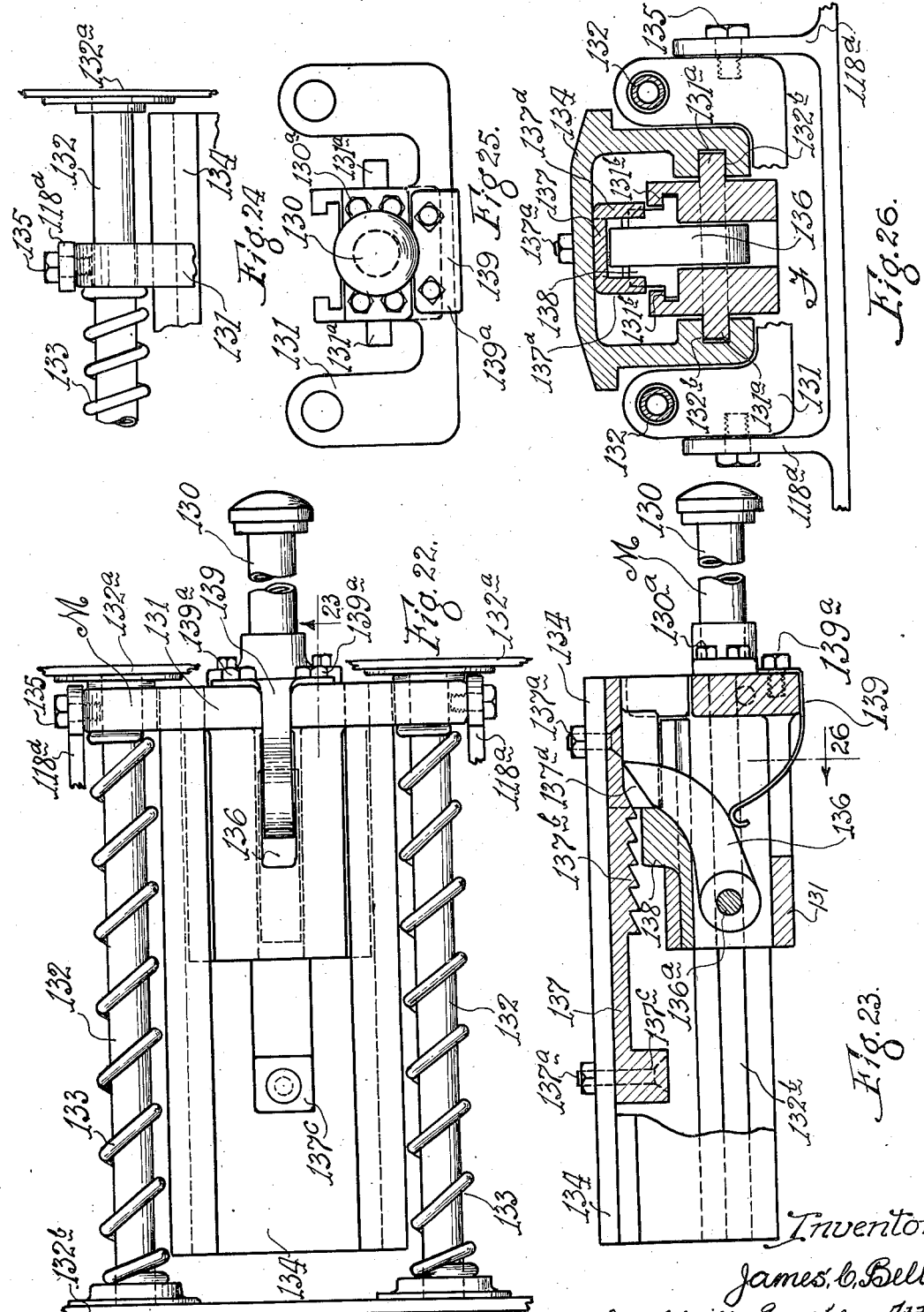

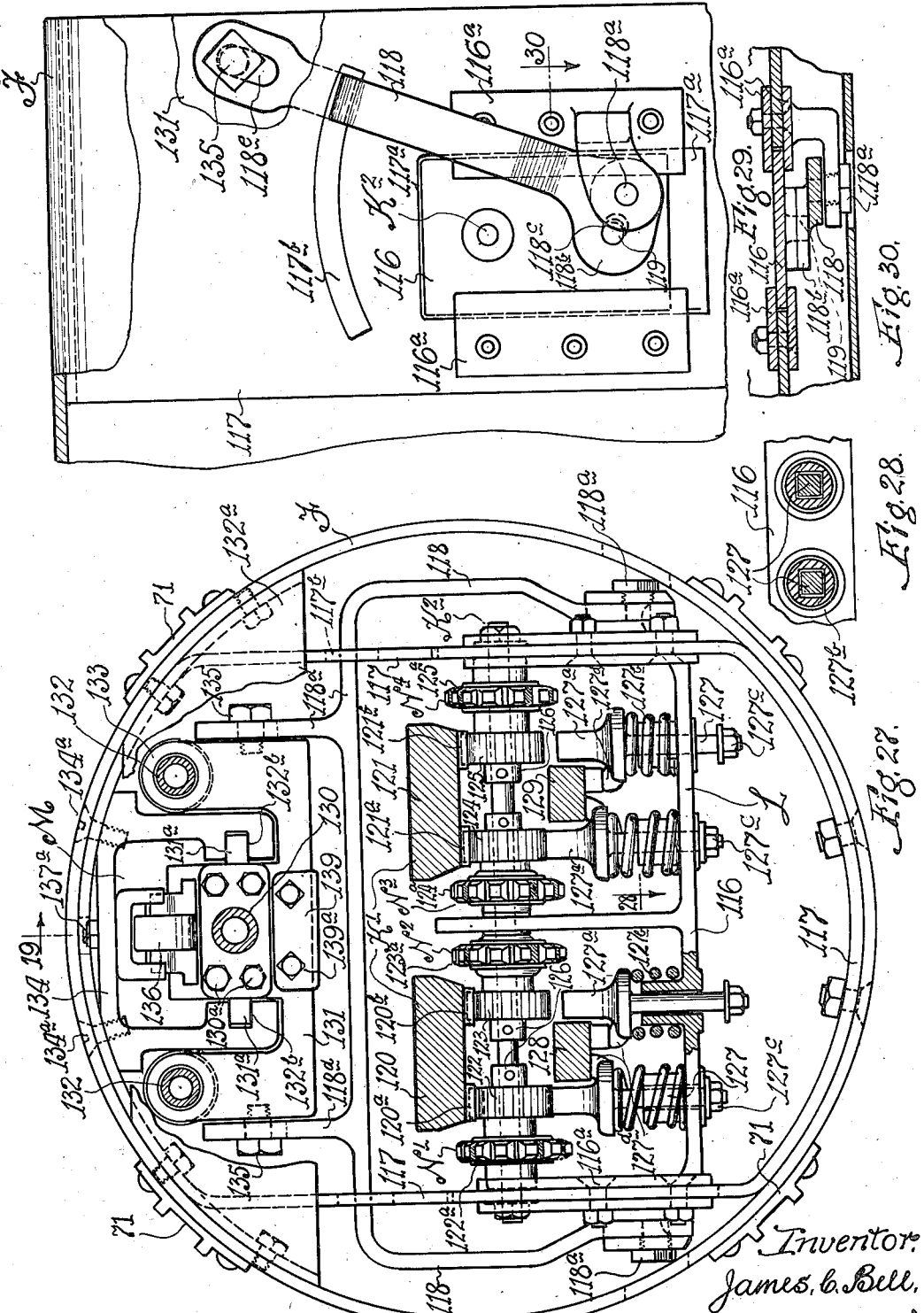

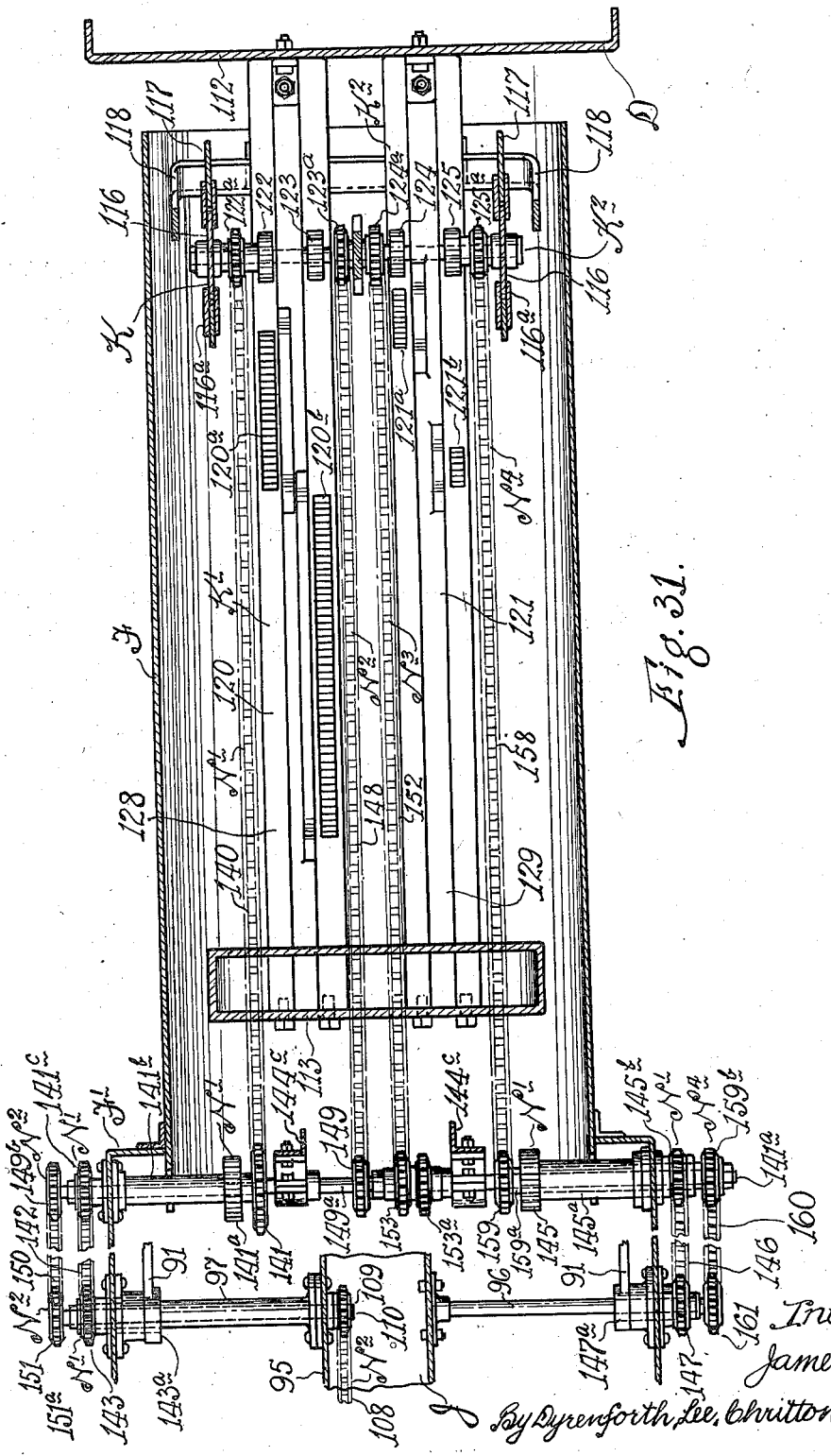

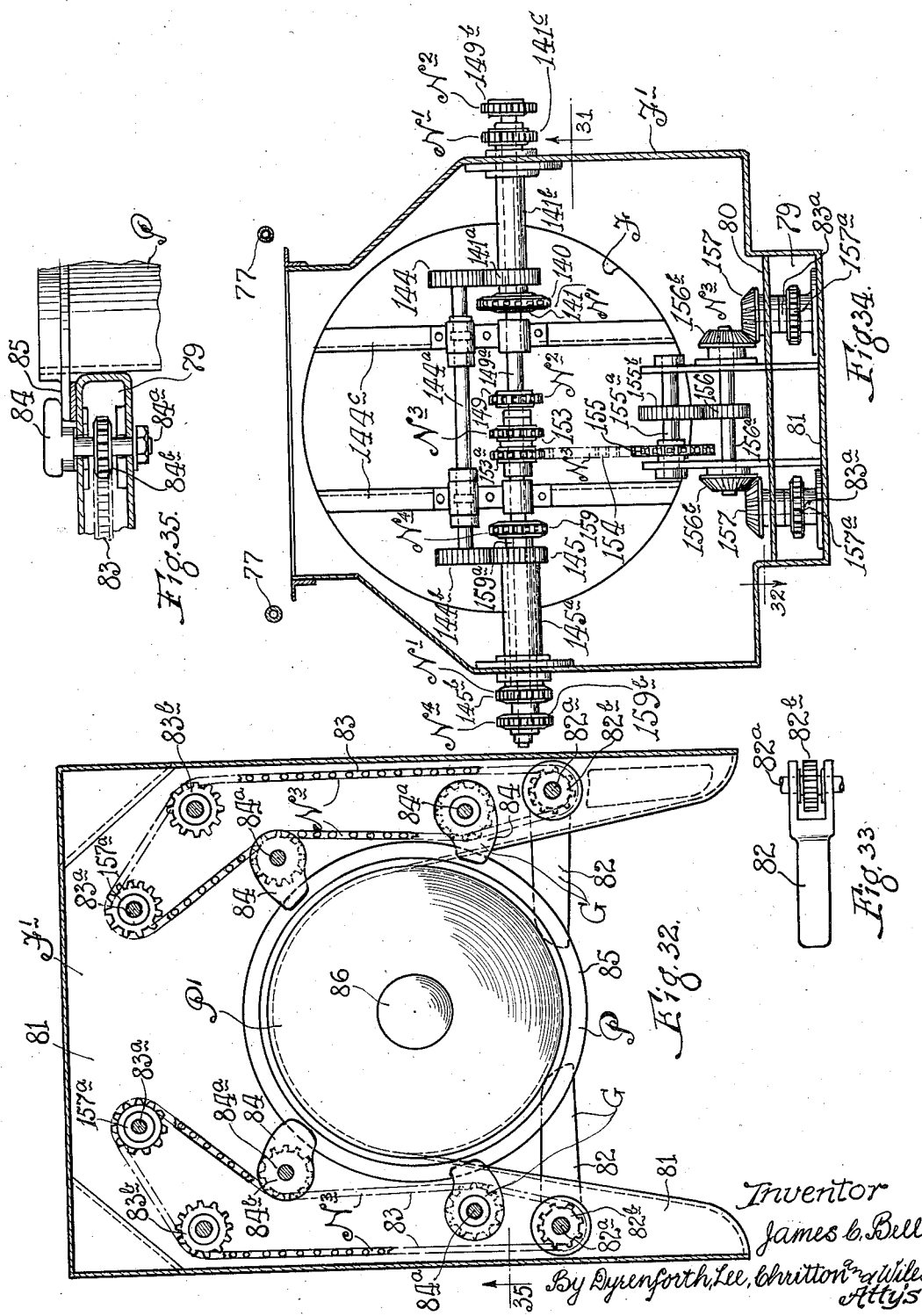

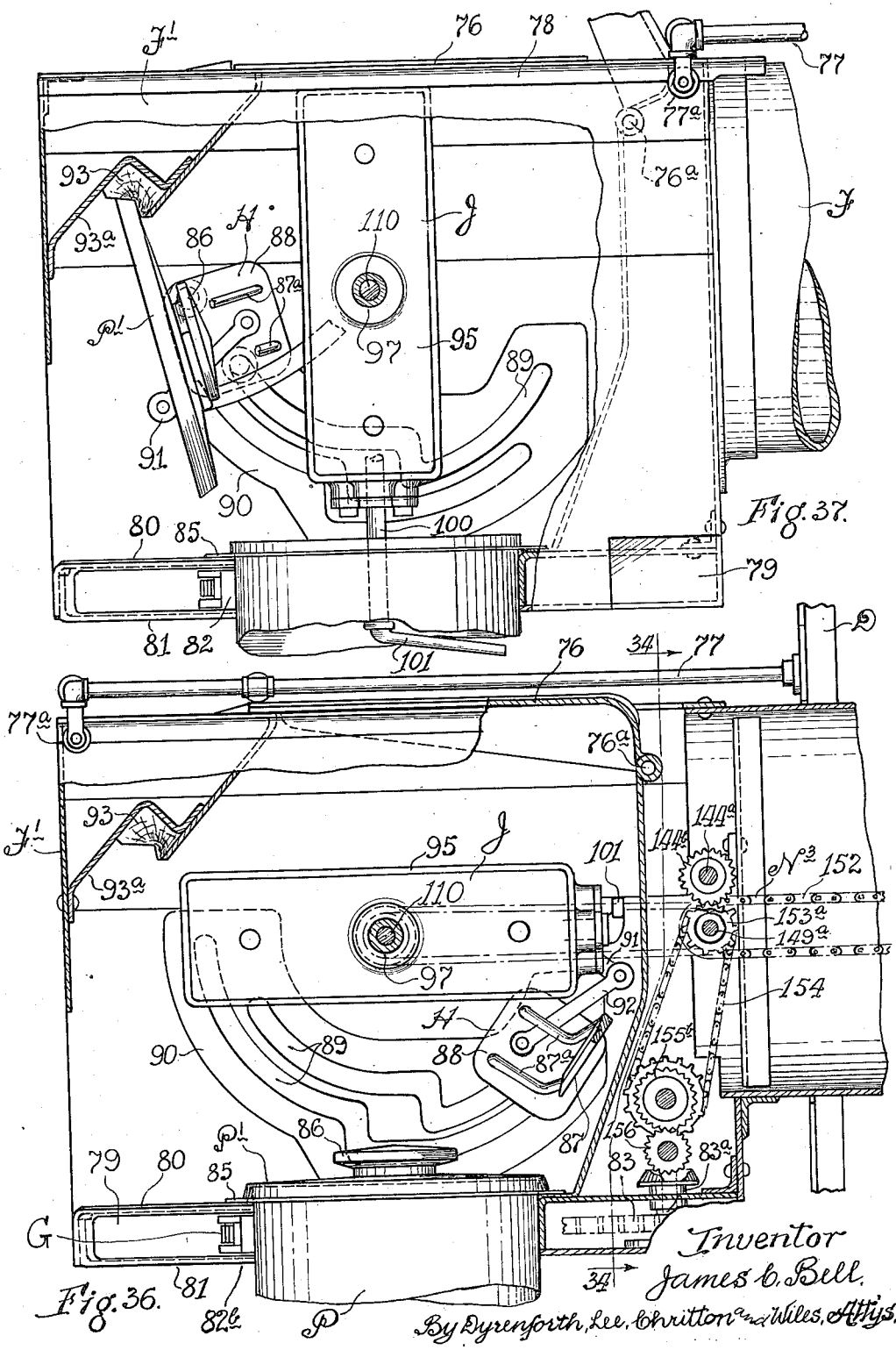

Nov. 5, 1935.  J. C. BELL  2,020,231
LOADING DEVICE
Filed May 5, 1933   16 Sheets-Sheet 13
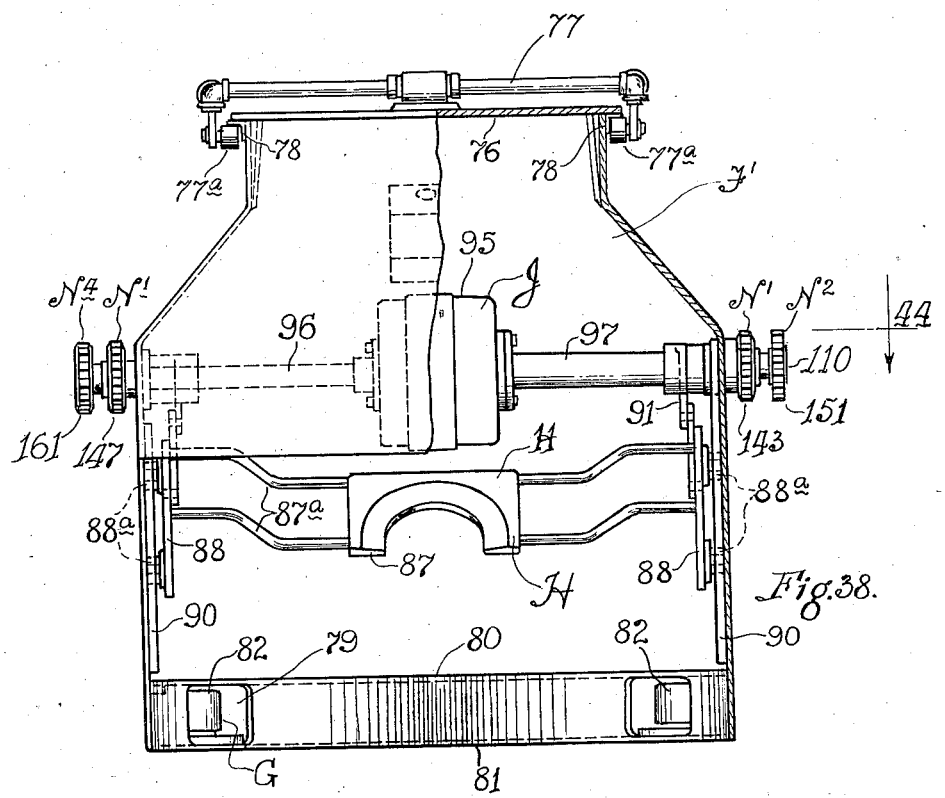
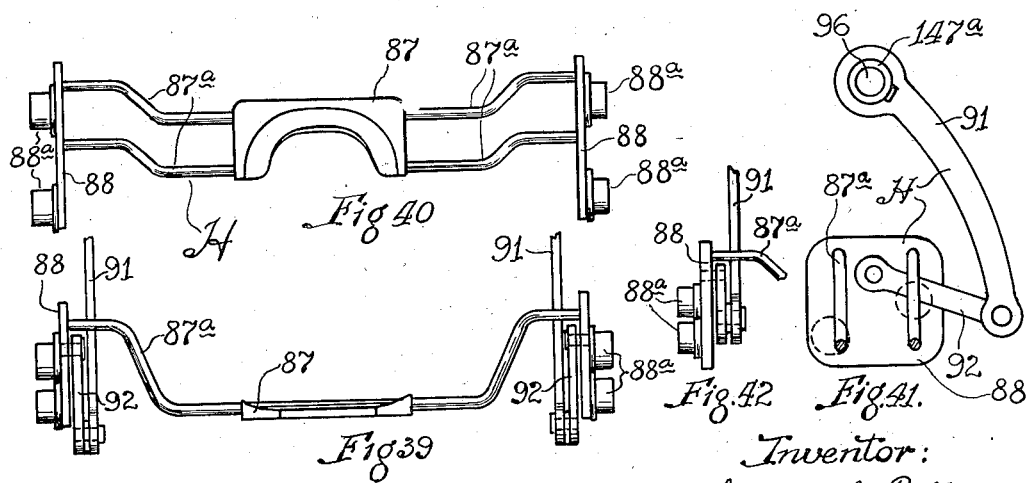
Inventor:
James C. Bell.
By Dyrenforth, Lee, Chritton and Wiles, Attys.

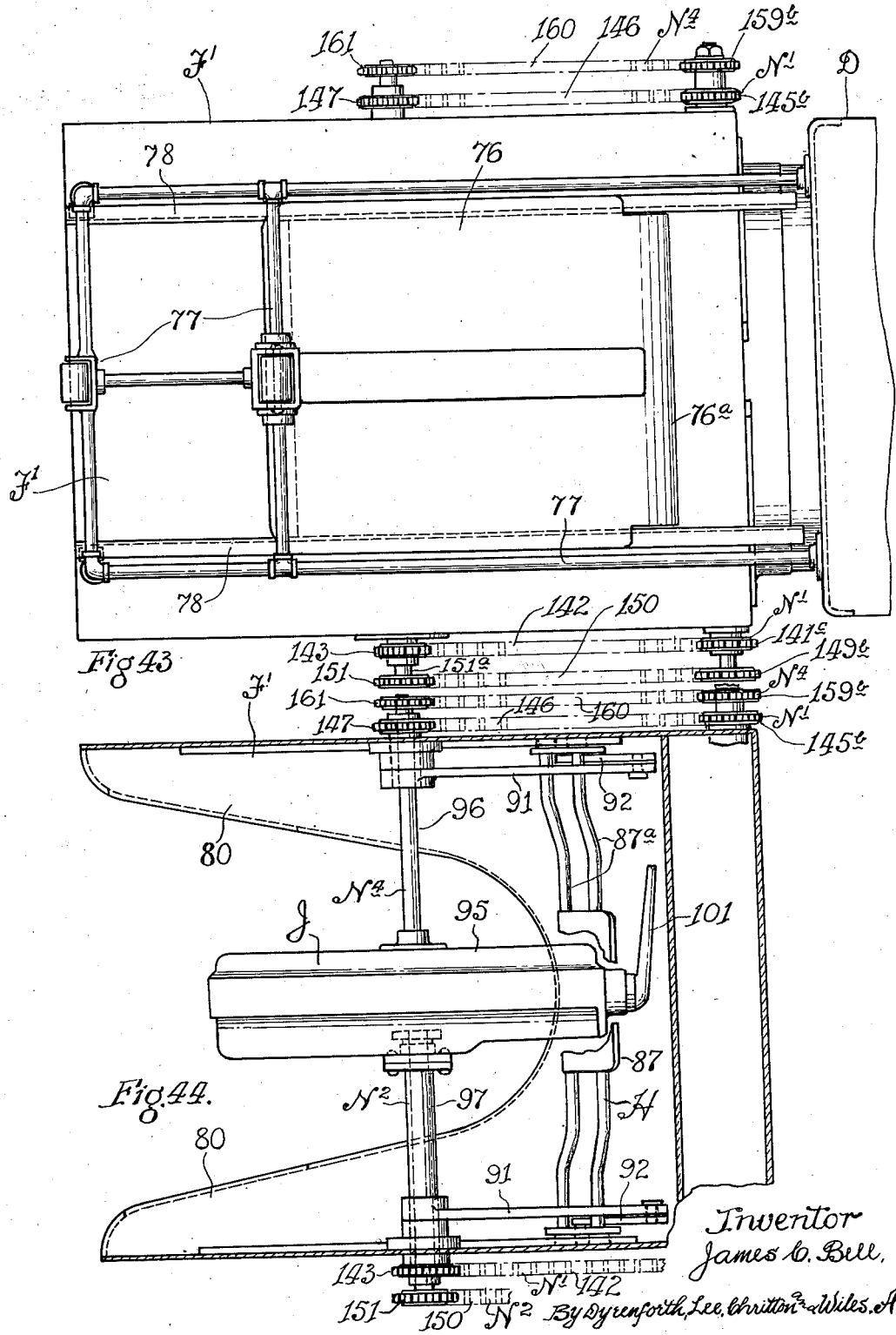

Nov. 5, 1935.   J. C. BELL   2,020,231
LOADING DEVICE
Filed May 5, 1933   16 Sheets-Sheet 15
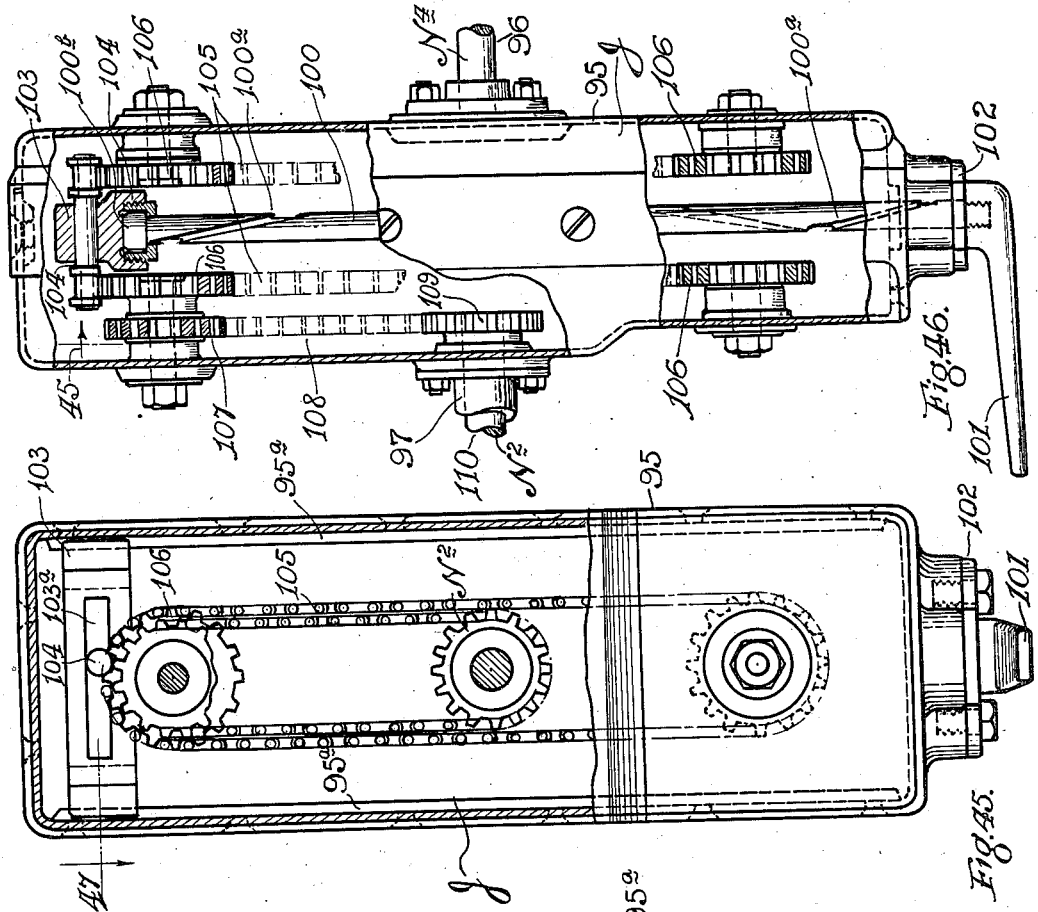
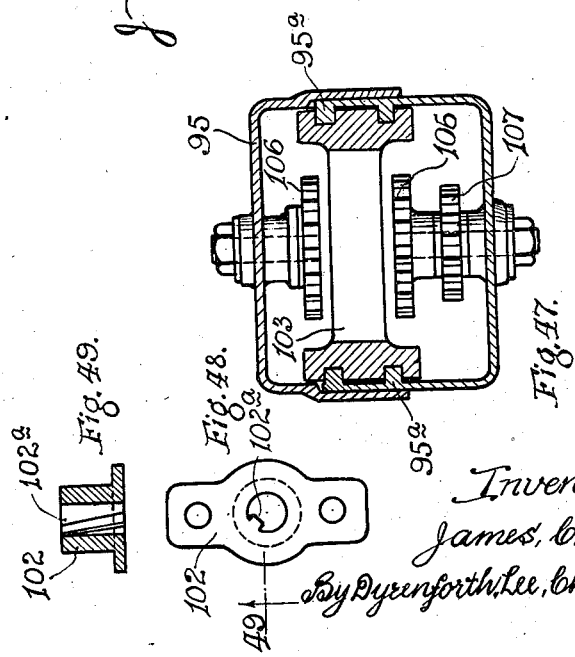
Inventor:
James C. Bell.
By Dyrenforth, Lee, Chritton & Wiles
Attys

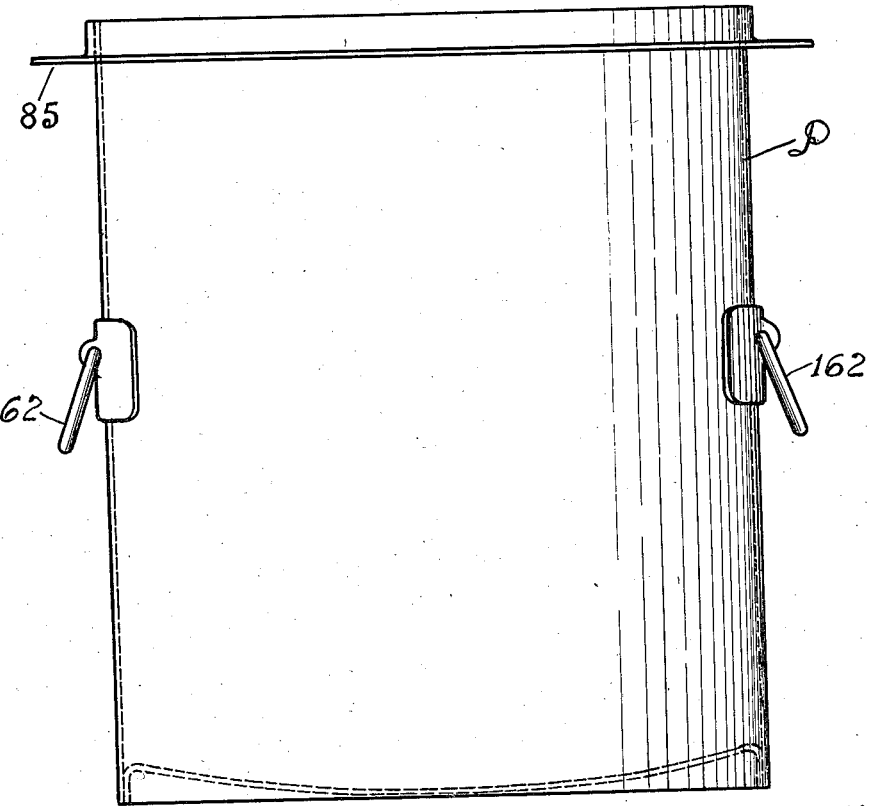

Patented Nov. 5, 1935

2,020,231

UNITED STATES PATENT OFFICE 2,020,231

LOADING DEVICE

James C. Bell, Joliet, Ill.

Application May 5, 1933, Serial No. 669,614

16 Claims. (Cl. 214—67)

This invention relates particularly to traveling loading devices adapted to pick up independent receptacles and empty their contents into receiving compartments which may, if desired, be in the form of trailers attached to the machines.

The primary object of the invention is to provide a machine which may be operated entirely from the driver's seat and may be driven up a street or alley to pick up, empty, and return receptacles or cans which are located on either side of the machine. The machine is well adapted to the collection of refuse, garbage, ashes and the like.

A further object of the invention is to provide a pick-up device which will reach out and pick up cans, which may be placed in various positions with respect to the machine, and lock the same within the grasp of an extensible and retractible arm so that the can may be inverted during the emptying operation.

A further object of the invention is to provide a cover-lifting device which will remove the cover from the can and return the same before the can is returned to its original position.

Another object of the invention is to provide a device which will enter the can and loosen up the contents thereof by a stirring operation while the can is in inverted position.

A further object of the invention is to provide a drive-means within the arm which serves to operate the can-grasping and locking device, cover-removing device and cleaning or stirring mechanism, at properly spaced intervals in the travel of the arm relative to its supporting frame.

A further object of the invention is to provide a control-means for throwing the drive-means into operative position at the desired time.

Numerous other objects and features of the invention will be understood as the description progresses.

The invention is illustrated in the preferred embodiment in the accompanying drawings, in which—

Figure 4:
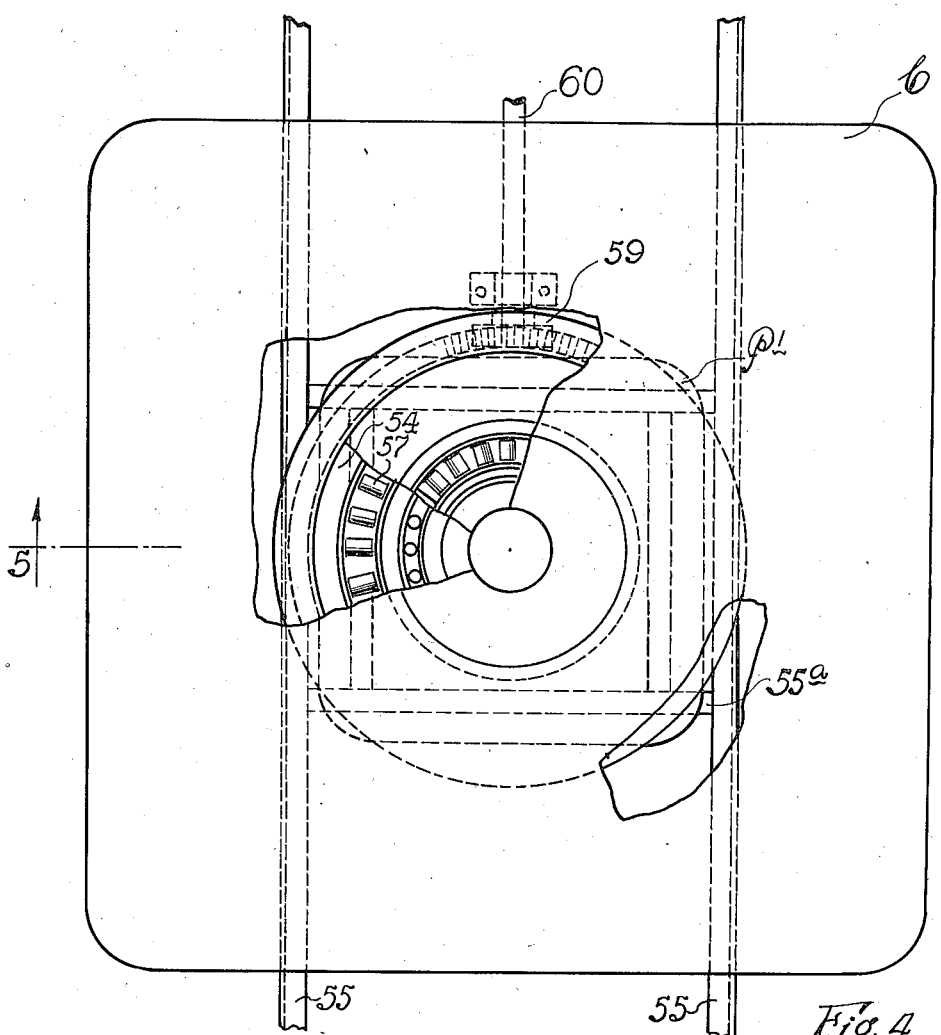
Figure 5:
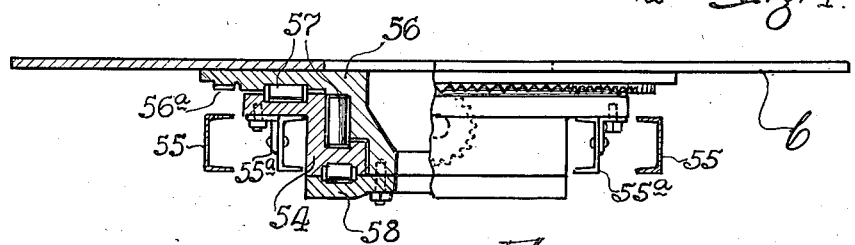

Fig. 1 is a side elevational view of a machine embodying the invention, the dumping position of the loading device being indicated by dotted lines; Fig. 2 is a broken side elevational view showing the hopper on the end of the extensible arm ready to pick up a can; Fig. 3 is a plan view of the machine; Fig. 4 is a broken plan view of the turntable which is mounted on the motor truck chassis; Fig. 5 is a broken detail sectional view of the turntable, taken as indicated at line 5 of Fig. 4; Fig. 6 is a sectional view taken as indicated at line 6 of Fig. 7, showing the housing frame in which an extensible and retractible arm is mounted; Fig. 7 is a broken side elevational view of the same; Fig. 8 is a perspective view of one of the supporting members of the housing frame which permits the frame to swing in a vertical plane; Fig. 9 is a side elevational view of one of the double-acting hydraulic rams which are used to operate various mechanisms in the machine; Fig. 10 is a plan view of a rack-bar which is driven by the ram and transmits power to an associated pinion; Fig. 11 is a broken plan view of the hydraulic ram, with the cylinder removed; Fig. 12 is a front end view of the same; Fig. 13 is a rear end view of the same; Fig. 14 is a broken side elevational view of the extensible arm and its associated ram; Fig. 15 is a view similar to Fig. 14, but showing the arm partially extended to the left; Fig. 16 is a broken sectional view taken as indicated at line 16 of Fig. 14; Fig. 17 is a broken detail sectional view of one of the ram-supporting brackets; Fig. 18 is a broken detail sectional view taken as indicated at line 18 of Fig. 14; Fig. 19 is a broken longitudinal sectional view of the extensible arm taken as indicated at line 19 of Fig. 27; Fig. 20 is a sectional view, taken as indicated at line 20 of Fig. 19; Fig. 21 is a composite view showing the relation between the rack-bar, its associated pinion, pinion-locking device and cam-bar for operating said locking device; Fig. 22 is a broken plan view from below of the control-mechanism for controlling the operation of a rack-drive mechanism, and is mounted in the upper rear end portion of the extensible arm; Fig. 23 is a broken sectional view of the same, taken as indicated at line 23 of Fig. 22; Fig. 24 is a broken detail view similar to Fig. 22, showing the crosshead of the control-mechanism in a depressed position; Fig. 25 is an end elevational view of the control-device; Fig. 26 is a sectional view taken as indicated at line 26 of Fig. 23; Fig. 27 is a vertical sectional view, taken as indicated at line 27 of Fig. 19; Fig. 28 is a broken detail sectional view, taken as indicated at line 28 of Fig. 27; Fig. 29 is a broken side elevational view showing the arm for moving the pinions into and out of engagement with the rack-bars; Fig. 30 is a broken sectional view, taken as indicated at line 30 of Fig. 29; Fig. 31 is a plan sectional view showing the rack-bars from below, taken as indicated at line 31 of Fig. 34; Fig. 32 is a plan sectional view of the can-grasping and locking mechanism, taken as indicated at line 32 of Fig. 34, with the top housing plate removed; Fig. 33 is a detail elevational view of one of the fingers shown in Fig. 32; Fig. 34 is a vertical sectional view, taken as indicated at line 34—34 of Fig. 36; Fig. 35 is a broken detail sectional view, taken as indicated at line 35 of Fig. 32; Fig. 36 is a vertical sectional view of the hopper mounted on the front end of the extensible arm and shows the cover-removing device; Fig. 37 is similar to Fig. 36 and shows the cover removed from the can; Fig. 38 is a broken vertical sectional view of the hopper showing the cover-removing device; Fig. 39 is a detail elevational view of the cover-engaging arm; Fig. 40 is a plan view of the same; Fig. 41 is an elevational view of an operating arm and cover-removing member; Fig. 42 is a broken end view of the mechanism shown in Fig. 41; Fig. 43 is a plan view of the hopper and door-closing mechanism; Fig. 44 is a broken plan sectional view, taken as indicated at line 44 of Fig. 38; Fig. 45 is a longitudinal sectional view of the cleaning or stirring-mechanism, taken as indicated at line 45 of Fig. 46; Fig. 46 is a broken elevational view, partly in section, of the same; Fig. 47 is a sectional view, taken as indicated at line 47 of Fig. 45; Fig. 48 is a detail view of the end-guide device; Fig. 49 is a sectional view, taken as indicated at line 49 of Fig. 48; Fig. 50 is an elevational view of a special receptacle or can designed for use with the loading device; Fig. 51 is an elevational view of the cover; and Fig. 52 is a broken plan view of the cover.

Referring to the drawings, A designates a motor truck chassis equipped with a driver's cab A'; B, a trailer adapted to fit onto the rear end of the chassis A; C, a turntable mounted on the chassis A; D, a housing-frame rotatably mounted on the turntable; E, double-acting hydraulic rams mounted on the turntable and adapted to rotate the housing-frame in a vertical plane; F, an extensible and retractible arm equipped at its front end portion with a hopper F' and an actuating ram F²; G, a can-grasping and locking device mounted in the hopper F'; H, a cover-removing device; J, stirring or cleaning device rotatably mounted within the housing; K, rack and pinion-mechanism for driving the devices G, H and J, and comprising rack-bars K', and a pinion-shaft K²; L, locking mechanism for the pinions on the shaft K²; M, control mechanism for moving the pinion-shaft K² into and out of engagement with the rack-bars K'; N, drive mechanism for transmitting power from the pinion-shaft K² to the devices G, H and J, N' supplying power to the cover-lifter H, N² power to rotate an internal member of the stirrer J, N³ power to operate the grasping and locking device G, and N⁴ power to turn the cleaner device J into operative position; and P, a receptacle or can provided with a cover P'.

The motor truck chassis A may be of any suitable construction and as it is preferred to operate the various parts of the loading-device by means of hydraulic pressure, the chassis will be equipped with a suitable oil pump which may be driven directly from the motor of the truck. It will be understood that the loading-device is ordinarily operated when the truck is standing still so that all of the motor power may be used to operate an oil pump if desired.

The motor truck is equipped with a cab A' which may be provided with glass panels 53 to assure the operator maximum visibility when operating the device. Within the cab are located the various control valves for operating the various rams. For the sake of simplicity the motor pump, hose connections and valves have not been shown, but their operation will be readily understood.

The motor chassis may be provided with a box to receive the material from the cans P but preferably, a detachable trailer B of the well known type is used.

Referring to Figs. 4 and 5, the turntable C comprises a socket-member 54 which is rigidly connected to the frame-members 55 of the truck by means of an auxiliary frame 55ᵃ; and a rotary member 56 is anti-frictionally journaled in said socket-member by means of rollers 57, and is prevented from tilting by means of a thrust-plate 58 which is rigidly connected to the member 56. The member 56 is further provided with a circular rack 56ᵃ which is engaged by pinion 59 on a shaft 60 which is journaled in the motor chassis and may be rotated by a double-acting hydraulic ram 61 in the cab A' by a sprocket and chain connection 62, which is similar to that shown with the device E.

The housing-frame D, as shown in Figs. 6 and 7, is journaled in brackets 63 on the turntable C by means of supporting members 64 which afford trunnions 64ᵃ. To the outer end portions of these trunnions are rigidly connected sprocket wheels 65. The supporting members are hollow so that the oil pipes may extend therethrough. The housing-frame may be made up of boiler plate if desired, and a counterweight 66 may be provided therein to help balance the weight of the arm F.

The double-acting hydraulic rams E are of the conventional type, comprising a cylinder 67 in which is mounted a piston 67ᵃ which, in turn, is connected to an underlying rack-bar 68 by means of a cross-head 68ᵃ. A pinion shaft 69 is journaled in the frame of the ram and is provided with a sprocket wheel 69ᵃ and a gear 69ᵇ, the latter being in engagement with the rack 68 so that forward or rearward movement of the piston 67ᵃ will cause the sprocket wheel to rotate. Preferably, a pair of rams E will be provided on opposite sides of the housing-frame D, as shown in Fig. 3, and the sprocket wheel 69ᵃ serves to drive the sprocket wheel 65 by means of a sprocket chain 70. The oil lines will be connected so that the rams may be moved positively in either direction by the operator in the cab A' and accordingly, the housing-frame may be rotated at will.

The retractible and extensible arm F preferably is of cylindrical shape and is provided on its outer surface with grooves or tracks 71 which are engaged by rollers 72 journaled in channel members 73. The channel members are rigidly connected to supporting plates 74 which, in turn, are rigidly connected to inner frame members 74ᵃ which are riveted to the housing-frame D. A double-acting ram F² is also secured to the housing-frame by means of brackets 74ᵇ, and as the ram F² is connected to the arm F by means of a bracket 75, the operator may extend or retract the arm from the housing D at will.

The hopper F' is rigidly connected to the arm F and encloses the locking, cover-removing and cleaning devices. As shown in Figs. 36–38 and 43, the hopper F' is equipped with a door 76 which is pivotally connected to the hopper at 76ᵃ. When the hopper is in retracted position, the door is held closed by means of a roller-frame 77 which is rigidly connected to the housing D. The hopper is provided with outwardly extending flanges 78 which are constantly engaged by under-clug rollers 77ᵃ on the frame 77, so that when the hopper is in retracted position, the cover will be tightly clamped in position, and when inverted and fully extended, the door will swing open by its own weight.

The lower portion of the hopper F' comprises a compartment 79, within which the can-grasping and locking mechanism G is contained, and has a U-shaped bottom wall and top wall 80 and 81, respectively, as shown in Figs. 32–38. This U-shaped recess is adapted to receive can P when the hopper is extended to pick up the can. In order to assure the can being properly positioned within the recess, a pair of fingers 82 are provided. These fingers are fixedly mounted on sprocket shafts 82ª which are equipped with sprocket wheels 82ᵇ and are actuated by sprocket chains 83 which are part of the drive-mechanism N³. When reaching to pick up a can, the fingers 82 are disposed within the front end portions of the chamber 79 and are rotated rearwardly, about 90°, to thrust the can home. While this is occurring, locking fingers 84, which are carried by sprocket shafts 84ª, having sprockets 84ᵇ, are rotated into locking position over a circular flange 85 provided on the can P. Thus, it will be understood that this mechanism G serves to properly position the can and lock its end portion within the hopper F' so that the can may be inverted with the arm F. The chains 83 are driven from power sprockets 83ª and idler sprockets 83ᵇ are also provided, journaled in the chamber 79 to keep the chains taut.

After the can has been locked in position in the hopper, the next step is to remove the cover and this function is accomplished by the mechanism H shown in Figs. 37–42. The cover P' is provided with a centrally disposed flanged knob 86 which is adapted to be engaged by the yoke 87, which is disposed between two supporting-plates 88 by means of arms 87ª. The plates 88 are each provided with a pair of cam rollers 88ª which travel in slots 89 provided in cam plates 90 which are rigidly connected to the side walls of the hopper F'. The slots 89 are so shaped that when the yoke 87 is advanced by means of the crank arms 91, connected through pitmans 92 to the supporting-plates 88, the yoke will slip under the knob 86, lift the cover from the can and swing the same up out of the way as indicated in Fig. 37. In the latter position, the edge of the cover abuts against a block 93 supported in a bracket 93ª of the hopper F', so that the cover is held in position firmly. The cranks 91 are driven by the mechanism N'. After the cover has been removed and the arm F inverted, the cleaner-mechanism J comes into operation to loosen the contents of the container by a stirring action. This mechanism is within a housing 95 (shown in Figs. 36–38 and 44–49), which is rigidly connected on one side to a shaft 96 and is supported on the other side by a hollow shaft 97. While the can is being picked up from the ground, the cleaner-mechanism is disposed horizontally as indicated in Fig. 36, but as the cover is being removed, it is swung into a vertical position as indicated in Fig. 37 by the drive-mechanism N⁴ acting on the shaft 96. While in the vertical position, a screw shaft 100 equipped at its lower end with a prong or finger 101, is forced into the can with a rotary movement. The rotary movement is imparted to the shaft by a gland-plate 102, which is rigidly connected to the bottom of the housing, and is provided with inwardly extending teeth 102ª which engage grooves 100ª provided in the shaft 100. The inner end of the shaft 100 is enlarged, as indicated at 100ᵇ, and is rotatably secured to a cross-head 103 by means of a gland-nut 104. The cross-head is provided with a slot 103ª and is adapted to slide longitudinally within the housing on guides 95ª. The cross-head is driven by means of a wrist-pin 104 which is pivotally connected at each end to a pair of sprocket chains 105, which are mounted on sprocket wheels 106 journaled within the housing 95. One of the sprocket wheels is rigidly connected to a sprocket wheel 107 which is driven by sprocket chain 108 from sprocket wheel 109, which is fixedly mounted on shaft 110 within the shaft 97, and is driven from the drive-mechanism N².

In order to operate the devices G, H and J, power is supplied to the drive-mechanism N by means of a rack and pinion-mechanism K, which is disposed within the cylindrical traveling arm F. In this mechanism, is a pair of rack-bars K' having their rear ends fixedly connected to a plate 112 secured to the inside of the housing-frame D, and their front ends rigidly connected to a cross-head 113 having rollers 113ª which engage tracks 114 within the arm F (see Fig. 20).

The pinion-shaft K², as indicated in Figs. 19 and 27–31, is supported at its ends and central portion by means of a carriage 116 which is slidably mounted, between guide-members 116ª, within slots 117ª provided in supporting-plates 117 which are rigidly connected to the inner side of the arm F. The carriage, with its pinion-shaft K², is moved into and out of engagement with the racks K' by means of crank-arms 118, which are pivotally connected at 118ª to the fixed guide-members 116ª. Slots 117ᵇ are provided within the supporting plates so that the cranks may extend therethrough. The cranks have short throw-arms 118ᵇ which are provided with elongated slots 118ᶜ, which engage studs 119 on the carriage 116 so as to move the same.

Referring to Fig. 27, rack-bar 120 is provided with a rack 120ª and a rack 120ᵇ. Likewise, rack-bar 121 is provided with a rack 121ª and a rack 121ᵇ. On the pinion-shaft K² is journaled a gear 122 which is rigidly connected to sprocket wheel 122ª of the drive-mechanism N'. In a like manner, pinion 123 engages rack 120ᵇ and drives its associated pinion 123ª of the mechanism N² when the shaft K² is moved longitudinally relative to the rack-bars. In the same manner, pinions 124 and 125 drive their sprockets 124ª and 125ª, so as to furnish power to the drive-mechanisms N³ and N⁴, respectively. The gears and sprockets are held in proper transverse position on the shaft by means of spacing collars 126 which are fixed to the shaft K². As will be understood by reference to Fig. 31, the various racks drive the associated pinions on the shaft K² at definitely spaced intervals.

In order that the sprockets may be locked in position when the associated pinions are out of engagement with the racks, the locking-mechanism L is provided. This mechanism is shown in Figs. 21, 27 and 28, and comprises four square push-rods 127 which are slidably mounted in the carriage 116. The push-rods are each provided at their upper ends with a tooth 127ª which is adapted to engage and lock the pinions on the shaft K². The push-rods are urged upwardly by means of compression springs 127ᵇ, and their upward travel is limited by means of nuts 127ᶜ provided at the lower ends of the rods. When the shaft K² is lowered, by means of the cranks 118, all of the pinions are locked by the teeth 127ª. Provision is also made for locking the gear as soon as it clears the end of its associated rack, and in order to release the gear just as the pinion is engaged by the rack, cam-bars 128 and 129 are provided. Like the rack-bars, the cam-bars are connected at their rear ends to plate 112, and are connected at their front end to cross-head 113. Each of the cam bars is provided with a pair of ways, as illustrated in Fig. 21, which correspond with the spacing of the racks on the associated rack-bar K'. These ways engage cam-surfaces 127$^d$ on the teeth 127$^a$. Thus, it will be understood that each of the pinions will be engaged at all times by either a rack or a locking tooth.

The plunger-operated control-mechanism M is provided to move the pinion-shaft K$^2$ into and out of engagement with the rack-bars. This device is operated from the cab of the truck by causing the arm F to be retracted sufficiently to bring the plunger 130 into engagement with the rack-bar supporting plate 112. The device has two positions: one where the plunger is fully extended to the rear, this position causing the cranks 118 to move the pinions into engagement with the racks, and in the other position, the plunger is partially retracted within the arm F so that the racks are not engaged. The mechanism is best shown in Figs. 19, and 22–30. The plunger 130 is rigidly connected to the cross-head 131 by means of bolts 130$^a$. The cross-head 131 is slidably mounted on a pair of guide-rods 132 which are secured to a rear plate 132$^a$ and a front plate 132$^b$, which in turn are riveted or bolted to the inner portion of the arm F. A pair of compression springs 133 urge the cross-head to its extreme rearward position. Between the guide-rods 132 (as best shown in Fig. 27), is suspended a housing 134 which is rigidly connected to the arm F by means of screws 134$^a$. This housing affords ways 132$^b$ for guides 131$^a$ on the cross-head 131. The crank-arms 118 terminate in a yoke 118$^d$ which is slidably and pivotally connected to the cross-head 131 by machine-screws 135 which engage slots 118$^e$ in the yoke. Thus, it will be understood that forward and rearward movement of the plunger 130 will move the shaft K$^2$. The central portion of the cross-head is hollow, as shown in Fig. 23, and supports a pawl 136 which is pivotally mounted on a wrist-pin 136$^a$ which is journaled in the cross-head. The pawl is adapted to engage a ratchet-bar 137 which is secured to the housing 134 by means of bolts 137$^a$. The ratchet-bar has a series of teeth 137$^b$, and is equipped at its front portion with a stop 137$^c$. The rear portion of the bar has downwardly projecting ears 137$^d$ which flank the path of the pawl 136. The cross-head 131 is further provided with ways 131$^b$ in which a door 138 is slidably mounted. The pawl 136 is urged upwardly into engagement with the ratchet-bar by means of a leaf-spring 139 which is secured to the cross-head by bolts 139$^a$.

It will be understood that when the plunger 130 is thrust forwardly into the arm F, that the pawl will engage the teeth and prevent the springs 133 from returning the plunger to its rearward extended position. However, when the plunger is further depressed, the sliding door 138 will engage the stop 137$^c$, cause the pawl to be depressed from engageable position with the teeth, and the cross-head will be free to return to its rearward extended position. During this return movement, the door 138 will hold the pawl depressed, but upon engagement with the rear stop 137$^d$, the door will be held and the pawl will continue to advance rearwardly into ratchet-engageable position.

The drive-mechanism N serves to transmit power from the pinion-shaft K$^2$ to the various devices in the hopper F'. The cover-removing device H is operated from the sprocket wheel 122$^a$ by the drive-mechanism N', shown in Figs. 31, 34 and 38, and comprises a sprocket chain 140 which drives sprocket wheel 141 and its associated gear 141$^a$, to which is connected a sleeve 141$^b$, which is journaled in the side wall of the hopper F', and is equipped on its outer end with a sprocket wheel 141$^c$. The sprocket wheel 141$^c$, by means of sprocket chain 142, drives a sprocket wheel 143 having a sleeve 143$^a$ upon which one of the cranks 91 is fixedly mounted. The gear 141$^a$ is in mesh with a gear 144 on a jack-shaft 144$^a$, having on its opposite end a pinion 144$^b$ which drives a gear 145 on a sleeve 145$^a$, which is journaled in the side wall of the hopper F', and is provided on the outer side with a sprocket wheel 145$^b$. The sprocket wheel 145$^b$, by means of sprocket chain 146, drives a sprocket wheel 147 on a sleeve 147$^a$, which is journaled in the side wall of the hopper F', and upon which the companion crank 91 is fixedly mounted. By this arrangement, both of the cranks 91 will be driven simultaneously and parallel movement of the cranks is obtained.

The stirring-mechanism in the cleaner-device J is driven from the sprocket wheel 123$^a$ by the mechanism N$^2$ which comprises a sprocket wheel 149 fixedly 148, which drives a sprocket wheel 149 fixedly mounted on a shaft 149$^a$, which is equipped at its outer end with a sprocket wheel 149$^b$. The sprocket wheel 149$^b$, by means of a chain 150, drives a sprocket wheel 151 on the shaft 110 mentioned above. A pair of frame members 144$^c$ serve to support the journals of shaft 149$^a$ and jack-shaft 144$^a$.

The can-grasping and locking device G is driven from the sprocket wheel 124$^a$ by means of the drive-mechanism N$^3$ which comprises a sprocket chain 152, which drives a sprocket wheel 153 and its associated sprocket wheel 153$^a$. The sprocket wheel 153$^a$, by means of a sprocket chain 154, drives a sprocket wheel 155, which is fixedly mounted on a jack-shaft 155$^a$ having a gear 155$^b$ which meshes with a gear 156 on a companion jack-shaft 156$^a$, equipped at both ends with beveled gears 156$^b$ which mesh with beveled gears 157 on the pinion-shafts 157$^a$ and drive the chains 83 by means of sprocket wheels 83$^a$.

The cleaner-device J is lowered into operative position by the sprocket wheel 125$^a$ through the drive-mechanism N$^4$. A sprocket chain 158, in mesh with sprocket wheel 125$^a$, drives a sprocket wheel 159 on a sleeve 159$^a$, journaled on shaft 149$^a$ and equipped at its outer end with a sprocket wheel 159$^b$. The sprocket wheel 159$^b$ drives a sprocket chain 160, which drives a sprocket wheel 161 rigidly connected with the outer end of the shaft 96.

The can P and its cover P' have been described above and are specially designed for use with the loading machine. As shown in Fig. 51, the can may be made of suitable sheet metal and preferably is provided with a pair of handles 162 which are riveted to the can to facilitate handling of the same. Flange 85 is securely attached to the uper marginal portion of the container by riveting, spot-welding or the like. The receptacles or cans may be of rather large size as all of the lifting is done by the machine without endangering the operator.

While hydraulic rams are preferred, due to the availability of power to operate the oil pump and also the high degree of exactness of operation which may be obtained, it is contemplated that the power may be applied to the drive-mechanism in several well known ways.

*Operation*

Cans of garbage, ashes, and other material will ordinarily be placed near both edges of an alley or street. The operator may drive down the center of the alley, and by the controls in the cab, pick up, empty, and return the cans in the following manner. The housing-frame D is rotated on the turntable and the arm F lowered and extended until the can is within the U-shaped arms of the hopper F'. During this operation, the control-device M has been held in its inner position so that the pinion-shaft K² has been out of engagement with the racks. The operator then tilts the arm F upwardly so that the flange 85 on the can P rests on the plate 80 of the hopper. The arm F is then fully retracted so that the control-mechanism M will be released, and the arm is then extended outwardly a short distance. Due to the release of the control-mechanism M, the racks will cause the fingers 82 to properly position the can within the hopper, cause the locking devices 84 to grip the flange of the can, and cause the device H to remove the cover. The operator then inverts the arm F over the housing-frame D, and further extends the arm F to its dumping position over the trailer B. This action will cause the stirring-device J to swing into operative position and enter the can and cause the contents to be deposited in the hopper over the door 76. Just as the hopper reaches its extreme extended position, the door 76 will be permitted to swing open, and the material will be dumped into the trailer. The operator then retracts the arm F and swings the arm back to the position near the ground. The arm is then retracted sufficiently to set the control-mechanism M and this retraction will replace the cover and unlock the can. The can may then be carried back to its original position by extension of the arm F. The cans may be picked up and replaced on either side of the alley. After the trailer has been filled, it may be replaced with an empty one, and another truck may take the loaded trailer to a dumping device.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A traveling loading-device comprising: an arm having means for picking up an independent receptacle having a cover; cover-lifting means mounted on said arm for removing and replacing said cover on the receptacle; and means for inverting said receptacle while the cover is removed to empty the same.

2. Mechanism as set forth in claim 1, including power-driven stirring-means for entering and stirring the contents of said receptacle while the same is inverted.

3. A traveling loading-device provided with a storage bin comprising: an arm having a hopper and means adapted to reach out and pick up a can; locking-means for positioning and fastening said can to the hopper; means for emptying the contents of said can into said hopper; and means for releasing the contents of said hopper into the bin.

4. A traveling loading-device provided with a storage bin comprising: an arm having a hopper adapted to pick up a can provided with a cover; means for removing and replacing said cover; locking means for positioning and fastening said can to the hopper; means for emptying the contents of the can into said hopper; and means for releasing the contents of said hopper into the bin.

5. In combination: a motor chassis upon which a loading device is mounted for oscillation in a horizontal plane, said loading device having an extensible and retractible arm mounted for oscillation in a vertical plane, gripping-means on said arm for grasping a receptacle, and drive-control means actuated by the extension and retraction movements of said arm for controlling the operation of said gripping-means.

6. Mechanism as specified in claim 5, including hydraulic plunger means for extending and retracting the arm and for oscillating said arm vertically.

7. In combination: a motor chassis upon which a loading-device is mounted for oscillation in a horizontal plane, said loading-device having an extensible and retractible arm mounted for oscillation in a vertical plane, gripping-means on said arm for engaging a receptacle having a cover, means for removing and replacing said cover, and drive-control means actuted by the extension and retraction of said arm for controlling the operation of said gripping-means and said cover-removing means.

8. In combination: a motor chassis upon which a loading-device is mounted for oscillation in a horizontal plane, said loading-device having an extensible and retractible arm pivotally mounted for movement in a vertical plane, gripping-means on said arm for grasping a receptacle, stirring-means adapted to enter said container and loosen the contents thereof, and drive-control means actuated by the retraction of said arm for controlling the operation of said gripping-means and stirring-means.

9. In combination: a motor chassis upon which a loading-device is mounted for rotation in a horizontal plane, said loading-device having an extensible and retractible arm mounted for rotation in a vertical plane; gripping-means on said arm for grasping a receptacle provided with a cover; cover-lifting means for removing and replacing said cover; stirring-means adapted to enter and loosen the contents of said container; and drive-control means actuated by the retraction of said arm for controlling the operation of said gripping-means.

10. In combination: a motor chassis having a loading-device pivotally mounted thereon; an arm extensibly and retractibly mounted in said loading-device; gripping-means on said arm for grasping a receptacle having a cover; cover-lifting means on said arm for removing said cover; drive-means for actuating said gripping-means and cover-lifting means, operated by extension and retraction of said arm; and drive-control means for controlling the operation of said drive-means, operated by the retraction of said arm.

11. Mechanism as specified in claim 10, including means on the arm for locking a receptacle thereon, and stirring means for entering and loosening the contents of the receptacle while the cover is removed.

12. In a loading-device: a frame having an extensible and retractible arm; means on said arm for grasping a receptacle having a cover; cover-removing means on said arm for removing said cover; a rack-member fixedly mounted on said frame; and gear-means carried by said arm in engagement with said rack, adapted to actuate the cover-removing means when the arm is moved relative to said frame.

13. Mechanism as specified in claim 12, including drive-control means for removing said gear-means into and out of engagement with said rack, said drive-control means being actuated by movement of said arm.

14. Mechanism as specified in claim 12, including drive-control means for moving said gear-means into and out of engagement with said rack, said drive-control means being actuated by movement of said arm, and means for locking the gear-means when not in engagement with said rack.

15. Mechanism as specified in claim 12, including drive-control means for moving the gear-means into and out of engagement with the rack, said drive-control means including a depressible plunger having at least two operating positions, means for holding said plunger partially depressed, and means for automatically releasing said plunger upon being fully depressed.

16. A material collector comprising: a motor truck chassis and a trailer connected thereto, said trailer having a bin provided with a material-receiving mouth; and a loading device mounted on said chassis comprising an extensible and retractible arm equipped at its outer end with a hopper having means for engaging and gripping a receptacle, means for inverting said receptacle to dump the contents into said hopper, and means for moving the hopper over the mouth of the trailer and for automatically opening the hopper while thereover to empty the contents into the trailer.

JAMES C. BELL.